T. E. MURRAY.
VEHICLE WHEEL.
APPLICATION FILED OCT. 2, 1914.
1,139,894.
Patented May 18, 1915.
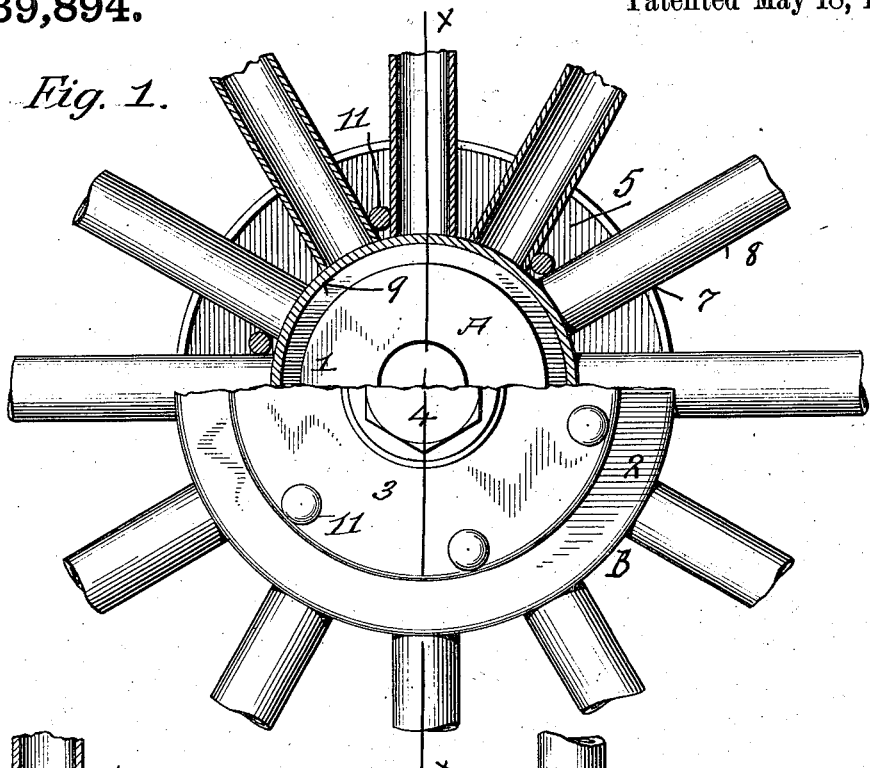
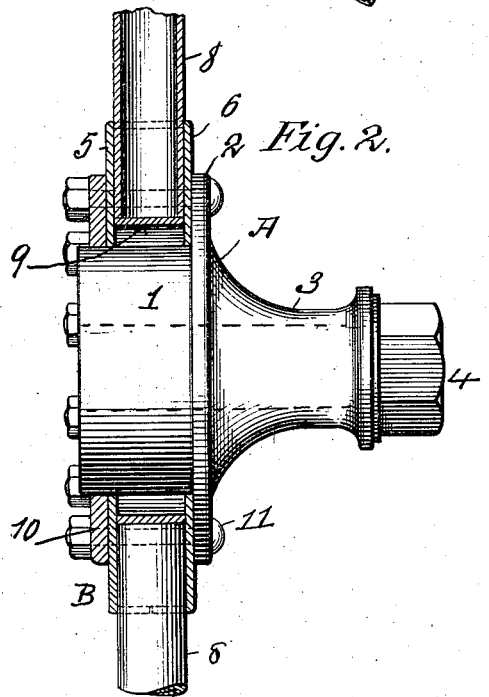
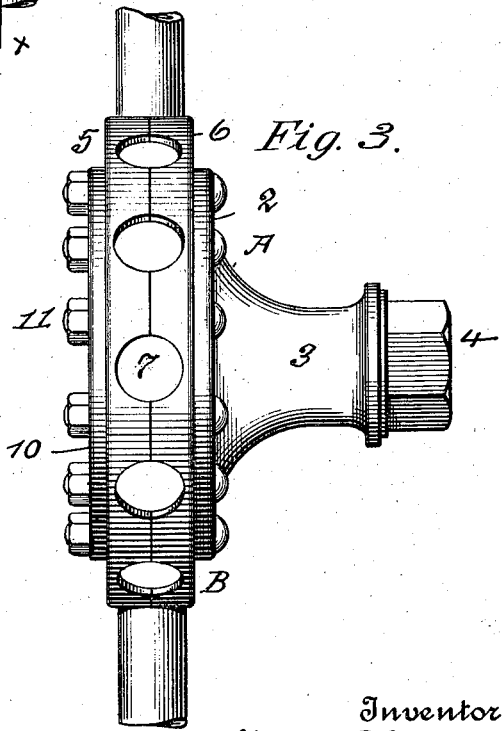
Witnesses:
Inventor
Thomas E. Murray
By his Attorney

UNITED STATES PATENT OFFICE.

THOMAS E. MURRAY, OF NEW YORK, N. Y.

VEHICLE-WHEEL.

1,139,894.  Specification of Letters Patent.  Patented May 18, 1915.

Application filed October 2, 1914. Serial No. 864,558.

*To all whom it may concern:*

Be it known that I, THOMAS E. MURRAY, a citizen of the United States, residing at New York, in the county of New York and State of New York, have invented a certain new and useful Improvement in Vehicle-Wheels, of which the following is a specification.

The invention is a vehicle wheel formed of sheet or thin metal, and has for its object to simplify and cheapen the construction. Said wheel comprises a hub formed with an annular spoke-receiving member and a tubular axle-receiving member detachably secured in the central opening of the annular member, so that these parts may be conveniently assembled or separated for repair or other purposes.

In the accompanying drawings—Figure 1 is a front elevation of the hub of my wheel, showing the inner ends of the spokes in place therein; the outer portions of the spokes being broken away and a portion of the hub being removed to exhibit the internal construction in section. Fig. 2 is a section on the line $x$, $x$ of Fig. 1. Fig. 3 is a side elevation of the hub, certain of the spokes being removed to show the spoke-receiving openings.

Similar numbers and letters of reference indicate like parts.

The hub of my wheel comprises a tubular axle-receiving member, generally indicated at A, and an annular spoke-receiving member, generally indicated at B. The annular spoke-receiving member receives the tubular axle-receiving member in its central aperture, and the two parts are detachably secured together, as hereinafter described, so that they may be separated whenever desired.

The tubular axle-receiving member A comprises the cylindrical portion 1 having an integral flange 2 and preferably a projection 3 closed at its outer end by any suitable cap or cover, indicated at 4.

The annular spoke-receiving member comprises two annular disks 5, 6, having their circumferential edges inwardly turned and approximated. Openings 7 are formed in said edges to receive tubular spokes 8, and the approximated edges between said spoke openings are homogeneously united, as by spot welding. Between the disks 5, 6 is a circular band 9 homogeneously united at its edges to the inner faces of said disks. Said band is concentric with the cylindrical portion 1 of the axle-receiving member A. The spokes 8 when placed in the openings 7 are seated at their ends upon the band 9.

The two disks 5, 6 and the band 9 welded thereto form a structural unit. Into the central opening in said disks the cylindrical part 1 of said tubular member may be removably inserted, the disk 6 then bearing against the hub flange 2. Upon the protruding rear portion of part 1 is placed a ring 10, through which and through the flange 2 and disks 5, 6 extend the headed bolts 11 disposed, as shown in Fig. 1, between the spokes, and binding spoke-receiving member B and the axle-receiving member A together.

I claim:

1. A vehicle wheel, comprising a hub formed with two annular disks having their outer circumferential edges inwardly turned and homogeneously united and provided with spoke openings in said edges, a circular band interposed between said disks and united thereto at its edges, and a tubular axle-receiving member entering the central opening in said disks and detachably secured thereto.

2. A vehicle wheel, comprising a hub formed of two annular disks having their outer circumferential edges inwardly turned and homogeneously united and provided with spoke openings in said edges, a circular band interposed between said disks and united thereto at its edges, a tubular axle-receiving member entering the central opening in said disks and protruding beyond said opening, a flange on said axle-receiving member, a ring on said protruding end of said tubular member, and removable bolts extending through said disks, said flange and said ring.

In testimony whereof I have affixed my signature in presence of two witnesses.

THOMAS E. MURRAY.

Witnesses:
  GERTRUDE T. PORTER,
  MAY T. MCGARRY.